March 24, 1964 W. DINKLOH 3,126,110
LOADING DEVICES FOR VEHICLES
Filed April 7, 1960 2 Sheets-Sheet 1

Inventor:
Walter Dinkloh
By
Pierce, Scheffler & Parker
his Attorneys

United States Patent Office 3,126,110
Patented Mar. 24, 1964

3,126,110
LOADING DEVICES FOR VEHICLES
Walter Dinkloh, Obernau, near Aschaffenburg, Germany, assignor to Gesellschaft für Linde's Eismaschinen Aktiengesellschaft, Hollviegelskreuth, near Munich, Germany, a company of Germany
Filed Apr. 7, 1960, Ser. No. 20,760
Claims priority, application Germany Apr. 7, 1959
1 Claim. (Cl. 214—77)

This invention relates to loading devices for vehicles.

The loading devices are known in which a horizontal lifting platform can be disposed in parallel planes by means of two lifting arms arranged substantially parallel, one of which lifting arms can usually be rotated mechanically or hydraulically. If these lifting platforms are applied to vehicles, especially those for industry, building and transport, then loads which are situated on the ground or on the load surface can be placed on the loading platform, without substantial change of level, and then can be raised or lowered until they are on a level with the desired spot. By these devices, loads can be moved easily from one height to another, without the need of lifting them by hand, so that for further unloading they need only be moved horizontally.

There are, also, loading devices in which the arrangement for receiving the load likewise consists generally of two pairs of parallel horizontally disposed guides which are raised until they are above the loading surface, whereafter they are rotated or tilted into the proper position by a second activating or release device, so that the loads can fall on the loading surface. For these latter loading devices two different arrangements are required, one to lift and one to tilt the lifting device.

The loading device according to this invention, especially for vehicles used in agriculture, industry, building and transport, with a lifting device for a lift platform with parallel lifting arms can be classified, as to equipment, in the first class, but tasks of the second category can also be carried out by it, and it is distinguished by an optional cross-over approach of the lifting arms to a load-receiving device, such as, for example, a shovel, a fork, a rake, a container for clay and the like, etc., with which the load can be picked up from the ground and shaken out or loaded on the loading surface.

To supplement the possibilities of use it is advisable that one or both lifting arms on each side are adjustable in length. This invention has the advantage that with only one lifting device and only one activating device for the same, both tasks—that is, a plane parallel lifting of a lift platform etc. and a loading by tipping or tilting a load-lift device—can be carried out. Since conversion from one kind of application to the other requires only the changing of two connection points of the lifting arms, the arrangement is the simplest possible.

The invention will now be described in greater detail, and with reference to the appended drawing in which are shown ways of carrying out this invention, the same corresponding parts being indicated by the same reference numerals throughout.

Figure 1:
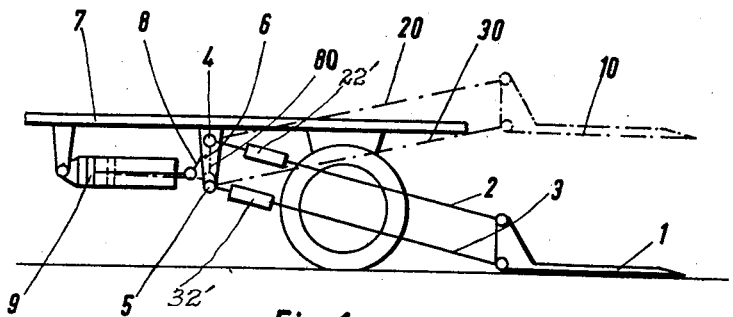
FIG. 1 is a somewhat diagrammatic representation of a lifting device applied to the rear portion of a vehicle.

FIG. 1 shows a lifting platform 1 arranged on a vehicle, with lifting arms 2 and 3 which move the platform, said lifting arms being supported by shafts 4 and 5 journaled in a block 6 which is fixed to the frame of a vehicle having a loading surface 7. It is to be understood that shafts 4 and 5 extend transversely of the major axis of the vehicle and that they are, at their opposite ends, journaled in a pair of blocks 6, one fastened to each of the two side frames of the vehicle; also, that two pairs of arms 2 and 3 are employed, one on either side of the rear portion of the vehicle.

By means of a lever or driving arm 8, fixed to shaft 4 (i.e., to the rock shaft), on one end of which lever a hydraulic cylinder 9 acts, the lifting arm or arms 2 can be rotated so that the lift platform 1 can be disposed in horizontal planes parallel to each other, particularly in such manner that loads can be brought up from the ground and raised to the height of the loading surface 7, but other heights can be reached also by the lifting platform. In the position 10, shown in broken lines, the lifting platform is raised to the height of the loading surface 7, while the lifting arms assume the position 20, 30, and the lever takes the position 80. This arrangement is, of itself, known.

Figure 5:
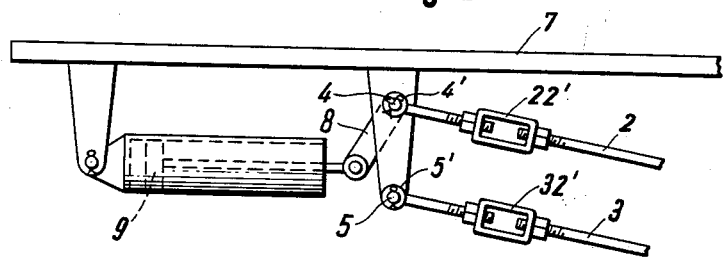
FIG. 5 is a perspective view, with certain parts broken away for greater clarity, of details of the connection between the lifting arm and the hydraulic cylinder shown in FIGS. 1–4.

As shown in FIG. 5, to the outer frame 7a of the vehicle there is secured a support 6 for the pivots of lifting arm 2 and of arm 3. Support 6 is, in FIG. 5, broken away so that the bearing 36, which supports shaft 4 within said support 6, becomes visible. Lifting arm 2 is keyed to shaft 4 so as to be connected rigidly with the latter and shaft 4 is further connected rigidly with the lever 8. Lever 8 in turn is connected flexibly with the piston rod 37 at one end of the latter. At the other end of said rod 37 a piston (diagrammatically indicated in FIGS. 1–4) is arranged in fixed position, which piston slides within the hydraulic cylinder 9. Hydraulic cylinder 9 is loaded by a pressure fluid through tube 38. The hydraulic cylinder 9 is flexibly mounted on a support 39 which in turn is fastened fixedly to the outer frame 7a of the vehicle. Shaft 4 is mounted within support 6 in such manner that it can rotate about its axis. The second shaft 5 is also mounted in support 6. Shaft 5 runs parallel to shaft 4 with the lifting arm 3 being pivotally mounted in support 6. Only one portion of lifting arm 2 is shown in FIG. 5 so that the individual parts can be depicted on a larger scale. The two lifting arms 2 and 3 are adjustable in length, by means of the turnbuckles 22', 32', and are interchangeable, either (a) at the two joints where the arms are connected to the load-receiving mechanism 1 or (b), as shown, at the axles 4 and 5, in which latter event lifting arm 2 is secured on axle 4 by cotter pin 4' and lifting arm 3 on axle 5 by cotter pin 5'.

Figure 2:
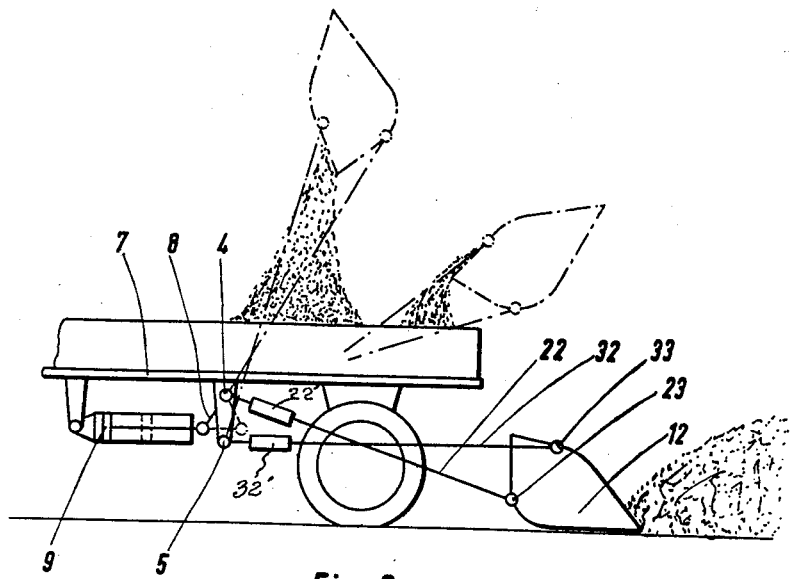
FIG. 2 is a view, similar to FIG. 1, showing a cross-over connection of the lifting arms of a lifting device, specifically, a shovel.

FIG. 2 shows a vehicle in which as a load receiving device a shovel 12 is attached to the crossed lifting arms 22 and 32 at connection points 23 and 33 according to this invention. By this arrangement, the shovel 12, upon lifting, describes the lifting and tilting movement shown in broken lines, so that the contents of shovel 12 are shaken out on loading surface 7. Arms 22 and 32 are extensible in length, as by turnbuckle means indicated at 22', 32', and are readily detachable from shafts 4 and 5 for converting the linkage from the crossed-over form shown in FIGS. 2, 3 and 4 to the parallel form illustrated in FIG. 1. By changing the length of the lifting arms and varying the speed, the bulk goods can be distributed over a wide range of the loading surface 7.

Figure 3:
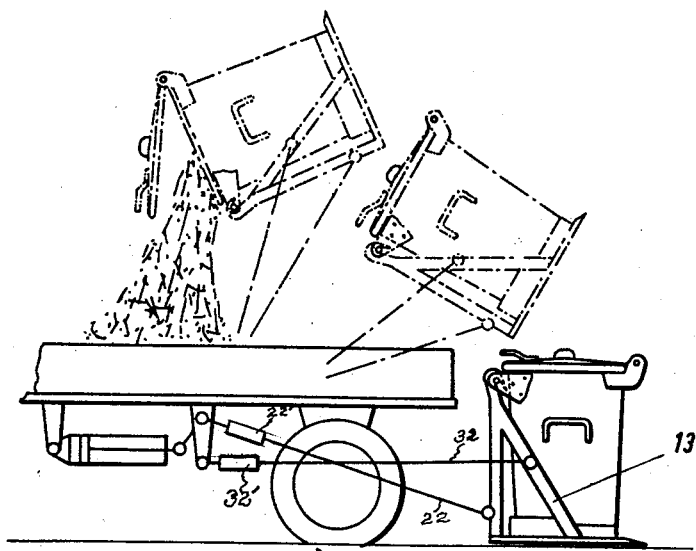
FIG. 3 is similar to FIG. 2 but showing a load receiving device for a container dumper, specifically, a clay tilter.

FIG. 3 shows a load receiving device as a clay tilter (dump) 13.

Figure 4:
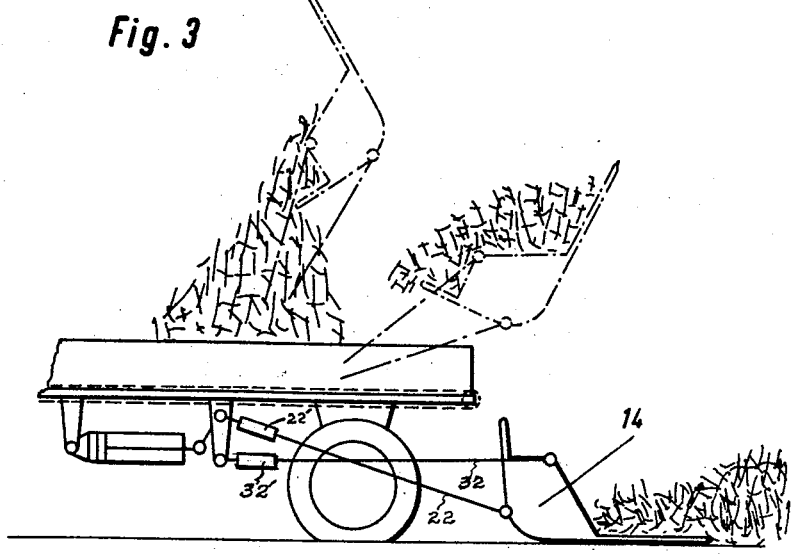
FIG. 4 is similar to FIGS. 2 and 3 but showing a fork or rake as load receiving device.

FIG. 4 shows a load receiving device as a fork or rake for ensilage, manure or the like.

It is to be understood that in the arrangements illustrated in FIGS. 2, 3 and 4 the shafts 4 and 5 may be, and preferably are, journaled in a pair of blocks 6—one on either side of the vehicle frame—and that pairs of arms 22, 32 may be, and preferably are, attached to opposite ends of said shafts.

The loading device according to this invention may for example, be applied both to motor-driven vehicles as well as trailers for the same. The drive is preferably hydraulic or mechanical, for example, from an auxiliary drive (power take-off shaft) out, through a spiral axle; or, alternatively, through racks and toothed segments or equivalent means.

The arrangement according to this invention can also be applied advantageously to vehicles with movable loading surface, such as manure spreaders, for example. The load can then be distributed as desired over the entire length of the loading surface.

I claim:

A device, arranged on a vehicle having a generally horizontal frame supporting a load-bearing floor, for lifting loads onto the floor of the vehicle, said device comprising two pairs of lifting arms articulated at both sides of the frame in a substantially vertical plane one above the other of which lifting arms at least one on each side is adjustable in length and at least one is attached to and articulatable by means of a driving mechanism carried by said frame, and a load-receiving means to which said two pairs of lifting arms are pivotally attached one pair on each side at pivots spaced in a substantially vertical direction, the pivotal attachments being readily detachable to effect lifting movement of the load-receiving means parallel to the floor when the two lifting arms on each side are of substantially even length and are attached in parallelogram form to a load-receiving lifting platform and to effect simultaneous lifting and tipping movements when the two lifting arms on each side are of unequal length and are attached in crossed relationship to each other to a load-receiving means to be tilted with respect to said floor.

References Cited in the file of this patent

UNITED STATES PATENTS

| | | |
|---|---|---|
| 2,067,879 | Whitmire | Jan. 12, 1937 |
| 2,121,960 | Frink | June 28, 1938 |
| 2,409,302 | Millikin | Oct. 15, 1946 |
| 2,531,993 | Smith | Nov. 28, 1950 |
| 2,707,057 | Gerst | Apr. 26, 1955 |
| 2,719,639 | Gerst | Oct. 4, 1955 |
| 2,986,293 | Konefes | May 30, 1961 |

FOREIGN PATENTS

| | | |
|---|---|---|
| 653,079 | Germany | Nov. 13, 1937 |

UNITED STATES PATENT OFFICE
CERTIFICATE OF CORRECTION

Patent No. 3,126,110 March 24, 1964

Walter Dinkloh

It is hereby certified that error appears in the above numbered patent requiring correction and that the said Letters Patent should read as corrected below.

In the grant, line 3, and in the heading to the printed specification, line 5, for "Hollviegelskreuth", each occurrence, read -- Hollriegelskreuth --.

Signed and sealed this 21st day of July 1964.

(SEAL)

Attest:

ESTON G. JOHNSON
Attesting Officer

EDWARD J. BRENNER
Commissioner of Patents